(12) United States Patent
Ishibashi et al.

(10) Patent No.: US 6,383,622 B1
(45) Date of Patent: May 7, 2002

(54) SLIDER FORMED OF FIBER-REINFORCED THERMOPLASTIC RESIN

(75) Inventors: Akira Ishibashi, Toyama; Mamoru Tanaka; Mutsuo Hirota, both of Toyama-ken; Yoshifumi Miyajima, Kurobe, all of (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/324,766

(22) Filed: Jun. 3, 1999

(30) Foreign Application Priority Data

Jun. 24, 1998 (JP) .............................. 10-192349

(51) Int. Cl.⁷ .............................................. A44B 19/00
(52) U.S. Cl. ................................ 428/299.1; 428/299.4; 24/381; 24/415
(58) Field of Search ..................... 428/299.1, 299.4; 24/381, 415

(56) References Cited

U.S. PATENT DOCUMENTS

| | | |
|---|---|---|
| 5,346,737 A | 9/1994 | Takahashi et al. |
| 5,906,967 A | 5/1999 | Kato et al. |

FOREIGN PATENT DOCUMENTS

| | | | |
|---|---|---|---|
| DE | 3444813 | * | 6/1986 |
| JP | 58-51120 | | 3/1983 |
| JP | 63-13050 | | 1/1988 |
| JP | 6-313050 | | 11/1994 |

* cited by examiner

*Primary Examiner*—Elizabeth M. Cole
(74) *Attorney, Agent, or Firm*—Finnegan, Henderson, Farabow, Garrett & Dunner, L.L.P.

(57) ABSTRACT

A formed article of fiber-reinforced thermoplastic resin which has been adapted for use in a sliding member by restoring the wear resistance once degraded by the addition of reinforcing fibers to the normal level is disclosed. This formed article comprises a fiber-reinforced resin material of a thermoplastic resin containing reinforcing fibers and incorporating therein additionally as a sliding property-imparting agent a material having a storage elastic modulus in the range of $3.5 \times 10^8$ Pa to $5.0 \times 10^8$ Pa in a service temperature range of 30° C. to 70° C. The ratio of incorporation of the sliding property-imparting agent is properly in the range of 4 to 10% by weight when the matrix resin is a polyamide-based resin or 4 to 20% by weight when the matrix resin is a thermoplastic resin other than the polyamide-based resin, respectively based on the total weight of the resin and the reinforcing fibers.

7 Claims, 7 Drawing Sheets

SLIDER FORMED OF FIBER-REINFORCED THERMOPLASTIC RESIN

BACKGROUND OF THE INVENTION

1. Field of the Invention

This invention relates to a formed article of fiber-reinforced thermoplastic resin excelling in wear resistance, and more particularly to a formed article of fiber-reinforced thermoplastic resin manufactured in the shape of a varying sliding member by subjecting to injection molding or extrusion molding a fiber-reinforced thermoplastic resin having the sliding quality thereof improved by incorporation therein of a suitable amount of a material possessing a storage elastic modulus within a prescribed range as a sliding property-imparting agent. The term "sliding property-imparting agent" used herein means a substance which is capable of improving a sliding property of the formed article of thermoplastic resin or lowering a friction coefficient thereof.

2. Description of the Prior Art

Heretofore, it has been customary to use a resin excelling in heat resistance and mechanical strength for resinous products which are used in sliding members. Specifically, the idea purporting that the resin to be used ought to acquire improved wear resistance by the step of increasing the rigidity of the resin prevails. This increase of the rigidity of resin is generally attained by the method of incorporating reinforcing fibers in the resin. When the resin obtained by this method is used particularly for the sliding member in a slide fastener, however, the sliding member has only low durability because it exhibits such notably inferior wear resistance that in a reciprocating closing test performed in accordance with Japanese Industrial Standard (JIS) S 3015, it becomes inoperative after about 60 open-close reciprocations.

SUMMARY OF THE INVENTION

When the formed article of thermoplastic resin is found to be deficient in rigidity, the thermoplastic resin used therein is generally made to incorporate therein a suitable amount of reinforcing fibers by way of compensation for shortage of mechanical strength. In terms of wear resistance, however, the reality of the reinforced thermoplastic resin is that the reinforcing fibers cause the thermoplastic resin to lose wear resistance because they are fated to function conversely as an abrasive.

An object of the present invention is to provide a formed article of thermoplastic resin which, with the view of improving the wear resistance of such a fiber-reinforced thermoplastic resin as mentioned above notably degraded in consequence of the addition of reinforcing fibers, incorporates therein a suitable amount of a material possessing an appropriate storage elastic modulus in the standard range of service temperatures or operating temperatures as a sliding property-imparting agent and acquires the improvement of wear resistance and proves fit for use as a sliding member.

To accomplish the object mentioned above, the basic mode of the present invention resides in providing a formed article of thermoplastic resin, which is characterized by comprising a fiber-reinforced resin material of a thermoplastic resin containing reinforcing fibers and incorporating therein additionally as a sliding property-imparting agent a material having a storage elastic modulus in the range of $3.5 \times 10^8$ Pa to $5.0 \times 10^8$ Pa in a service temperature range of 30° C. to 70° C.

One specific mode of the present invention provides a formed article of thermoplastic resin, which is characterized by comprising a fiber-reinforced resin material of a polyamide-based resin containing reinforcing fibers and incorporating therein additionally as a sliding property-imparting agent a material having a storage elastic modulus in the range of $3.5 \times 10^8$ Pa to $5.0 \times 10^8$ Pa in a service temperature range of 30° C. to 70° C. at a ratio in the range of 4 to 10% by weight, based on the total weight of the resin and the reinforcing fibers mentioned above.

Another specific mode of the present invention provides a formed article of thermoplastic resin, which is characterized by comprising a fiber-reinforced resin material of a thermoplastic resin (excluding a polyamide-based resin) containing reinforcing fibers and incorporating therein additionally as a sliding property-imparting agent a material having a storage elastic modulus in the range of $3.5 \times 10^8$ Pa to $5.0 \times 10^8$ Pa in a service temperature range of 30°C. to 70° C. at a ratio in the range of 4 to 20% by weight, based on the total weight of the resin and the reinforcing fibers mentioned above.

BRIEF DESCRIPTION OF THE DRAWINGS

Other objects, features, and advantages of the invention will become apparent from the following description taken together with the drawings, in which.

DETAILED DESCRIPTION OF THE INVENTION

Figure 1:
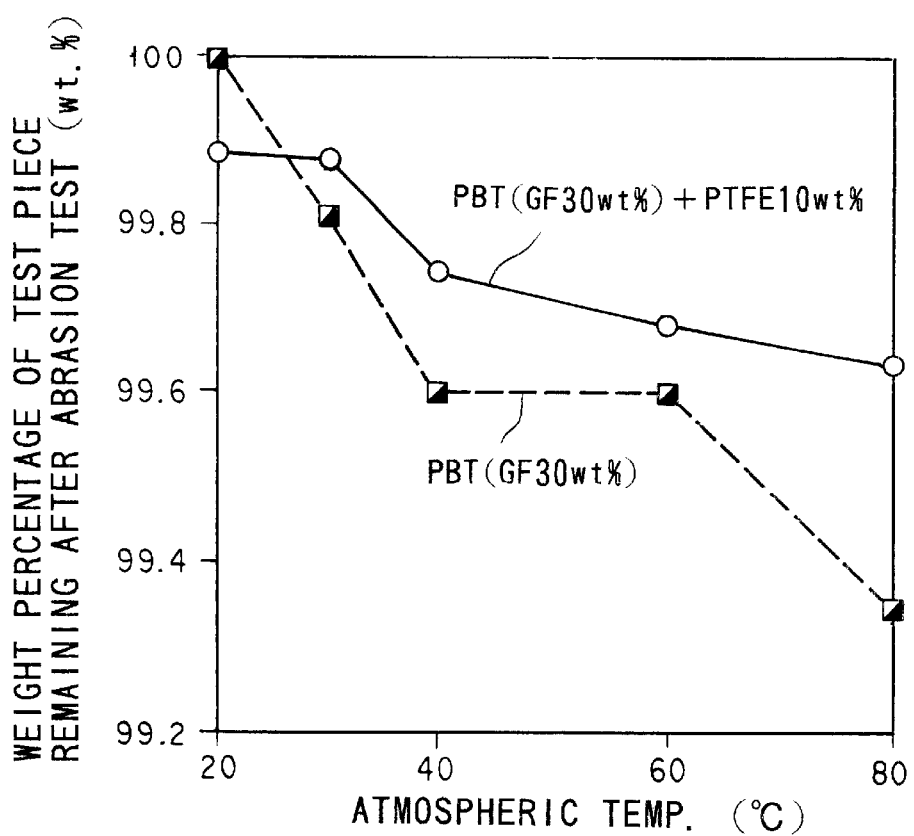
FIG. 1 is a graph showing changes in amount of abrasion found in an abrasion resistance test performed on polybutylene terephthalate containing 30% by weight of glass fibers and a fiber-reinforced resin containing the glass fiber-containing polymer just mentioned and 10% by weight of polytetrafluoroethylene additionally incorporated therein.

The present inventors, in consequence of a diligent study performed with a view to improving the wear resistance of the thermoplastic resin reinforced with reinforcing fibers, have taken notice of the correlation between the temperature dependence of the elastic modulus representing the viscoelastic behavior of a material used as a sliding property-imparting agent, namely the storage elastic modulus representing the elasticity having no energy dissipation and the loss elastic modulus concerning energy dissipation (Source: Seiichi Nakahama et al., "Essential Polymer Science", Kodansha Scientific, 1998, pp. 218–222), and the wear resistance of a fiber-reinforced resin incorporating therein the sliding property-imparting agent and have consequently discovered that when a material possessing an appropriate storage elastic modulus in the standard range of service temperatures is added as a sliding property-imparting agent in a suitable amount to a fiber-reinforced resin, the material consequently produced acquires notably improved wear resistance as evinced by the fact that it retains proper elasticity even after the temperature thereof has been slightly elevated to the service temperature range or operating temperature range (generally 30–70° C.) of a sliding member, which is produced by the frictional heat caused by the sliding motion thereof. The present invention has been perfected as a result. That is, the present invention is characterized by adding a material having a storage elastic modulus in the range of $3.5 \times 10^8$ Pa to $5.0 \times 10^8$ Pa in a service temperature range of 30° C. to 70° C. as a sliding property-imparting agent in a proper amount to a fiber-reinforced thermoplastic resin thereby providing a material which permits production of a formed article vested with the wear resistance heretofore unattainable by the formed articles of this class. To be specific, the impartation of the excellent wear resistance is attained by mixing the material possessing the storage elastic modulus in the range mentioned above as a sliding property-imparting agent at a prescribed quantitative ratio with reinforcing fibers and a thermoplastic resin or with a thermoplastic resin containing reinforcing fibers and then molding the resultant mixture by the injection molding technique or the extrusion molding technique thereby obtaining a formed article.

When a sliding part formed of a thermoplastic resin containing such reinforcing fibers as glass fibers and a sliding part formed of a similar thermoplastic resin but containing no reinforcing fibers are compared regarding wear resistance and the results of the comparison are rated in terms of the number of sliding motions performed by the sliding part without disengagement from fastener chains and the amount of abrasion suffered to be sustained, it is demonstrated that the former sliding part suffers a marked decrease in the number of sliding motions and an increase in the amount of abrasion. The results indicate that the former sliding part possesses very inferior wear resistance to the latter sliding part. The very poor wear resistance is logically explained by a supposition that the reinforcing fibers such as glass fibers function as a reinforcing material so long as they are present in the formed article but that once they are liberated to the surface of the formed article, they function as an abrasive and shave the sliding part itself and the part which is in contact therewith because they have higher rigidity than the thermoplastic resin serving as the matrix. The use of the reinforcing fibers has the precondition that they be utilized for a member which is in need of high strength. Wherever a thermoplastic resin is used for this member, the use of the reinforcing fibers is indispensable.

In the light of the conventional idea mentioned above and the issues arising therefrom, the present invention has been attained from the following viewpoint. In short, the present invention prevents the formed article of thermoplastic resin containing such reinforcing fibers from abrasion by causing the formed article to incorporate a more soft material, namely a material possessing lower storage elastic modulus and loss elastic modulus than the fiber-reinforced thermoplastic resin within a prescribed temperature range, as a sliding property-imparting agent in a proper amount.

The proper ratio of incorporation of the sliding property-imparting agent varies with the kind of matrix resin. It is in the range of 4 to 10% by weight in the case of a polyamide-based resin or in the range of 4 to 20% by weight in the case of other thermoplastic resin than the polyamide-based resin, based on the total weight of the resin and the reinforcing fibers. If the ratio of incorporation of the sliding property-imparting agent is less than the lower limit of the range mentioned above, the produced material will not acquire fully satisfactory wear resistance. Conversely, if the ratio is larger than the upper limit of the range, the formed article consequently obtained will be deficient in strength. Further, since the material which is suitable as the sliding property-imparting agent is generally expensive, the excess of the ratio constitutes itself a major factor for boosting the cost of production of the formed article and proves unfavorable from the economic point of view.

The sliding property-imparting agent mentioned above imposes no restriction particularly but requires only to be a material which exhibits a storage elastic modulus in the range of $3.5–5.0 \times 10^8$ Pa in the service temperature range, 30–70° C., of a sliding part. Every material which fulfills this requirement, therefore, is usable. As concrete examples of the material, fluoropolymers such as polytetrafluoroethylene (PTFE), tetrafluoroethylene-hexafluoroethylene copolymer (FEP), tetrafluoroethylene-perfluoroalkylvinyl ether copolymer (PFA), modified tetrafluoroethylene-ethylene copolymer (E/TFE polymer), polyvinylidene fluoride (PVDF), polychlorotrifluoroethylene (PCTFE), chlorotrifluoroethylene-ethylene copolymer (E/CTFE polymer), and polyvinyl fluoride (PVF) and polyethylene may be cited. Among other materials enumerated above, polytetrafluoroethylene proves particularly favorable.

Now, the operation of the present invention will be described below by reference to the accompanying drawings.

FIG. 1 shows the changes in the amount of abrasion found in an abrasion resistance test performed on a test piece prepared from a fiber-reinforced resin produced by combining polybutylene terephthalate (PBT) with 30% by weight, based on the weight of PBT, of glass fibers (GF) and a test piece prepared from a fiber-reinforced resin produced by combining the fiber-reinforced resin mentioned above with 10% by weight, based on the weight of the fiber-reinforced resin, of polytetrafluoroethylene (PTFE). In the diagram, the abscissa axis is the scale of the atmospheric temperature of the site of abrasion test and the ordinate axis the scale of the weight percentage of the amount of the test piece remaining after a prescribed period of the test, with the weight of the test piece prior to the test taken as 100%.

The abrasion test was performed by using a method of keeping a disklike abrading member in rotation and pressing with a weight the test piece against the rotating abrading member from above. During this test, the load was set at 0.5 kgf/mm$^2$ and the speed at 19.4 m/min. The duration of the test was set at 30 minutes.

As shown in FIG. 1, the fiber-reinforced resin incorporating therein in a proper amount the resin (PTFE) definitely inferior in terms of strength and deficient in storage elastic modulus as a sliding property-imparting agent, as compared with the fiber-reinforced thermoplastic resin, did not show the effect of addition of the resin in the neighborhood of normal room temperature of about 20° C. but, in a temperature range exceeding the neighborhood of 30°C., all the species of fiber-reinforced resin showed increases in the absolute amount of abrasion, though the increases were small as compared with the increase found in the fiber-reinforced thermoplastic resin omitting the incorporation of the resin of low storage elastic modulus. These results indicate the added agent brought an improvement in wear resistance. Incidentally, this trend continued to exist up to the neighborhood of 80° C.

Figure 2:
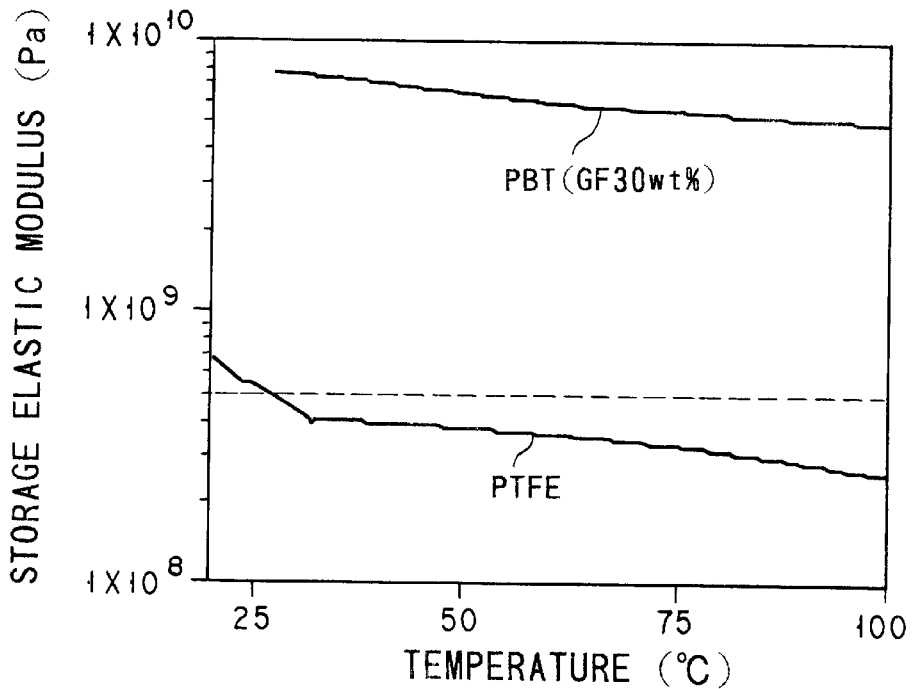
FIG. 2 is a graph showing changes in the storage elastic modulus of polytetrafluoroethylene and that of polybutylene terephthalate containing 30% by weight of glass fibers with temperature.

Thus, the wear resistance of the thermoplastic resin reinforced with fibers was markedly improved in an approximate temperature range of 30° C. to 80° C. by the incorporation therein in a proper amount of the resin (PTFE) as a sliding property-imparting agent having a lower storage elastic modulus than the fiber-reinforced resin. The temperature dependence of the storage elastic modulus of the sliding property-imparting agent (PTFE) was as shown in FIG. 2. The storage elastic modulus was measured by the use of an automatic dynamic viscoelasticity measuring device.

In FIG. 2, the storage elastic modulus of the fiber-reinforced thermoplastic resin (PBT+30% by weight of GF) omitting the incorporation of PTFE was shown together with the storage elastic modulus of PTFE. It is easily noted from the graph that the fiber-reinforced thermoplastic resin omitting the incorporation of the PTFE showed a large storage elastic modulus within the range of service temperature.

Still more important point is the fact that the effect of the material added as the sliding property-imparting agent did not manifest at 20° C. and it manifested beyond a temperature of about 30° C. This fact implies that the temperature dependence of the sliding property-imparting agent participated largely in the wear resistance of the fiber-reinforced thermoplastic resin. To be more specific numerically, it is important that the storage elastic modulus of the sliding property-imparting agent be not more than $5 \times 10^8$ Pa at temperatures exceeding 30° C.

As respects the manifestation of the effect at temperatures exceeding 30° C., when a sliding member was caused to slide, specifically when a slider part for a slide fastener, for example, was set on a fastener chain and left reciprocating at normal room temperature, the temperature of the slider part rose up to 35° C. This fact is thought to imply that the temperatures exceeding 30° C. constituted themselves a practically effective range.

Figure 3:
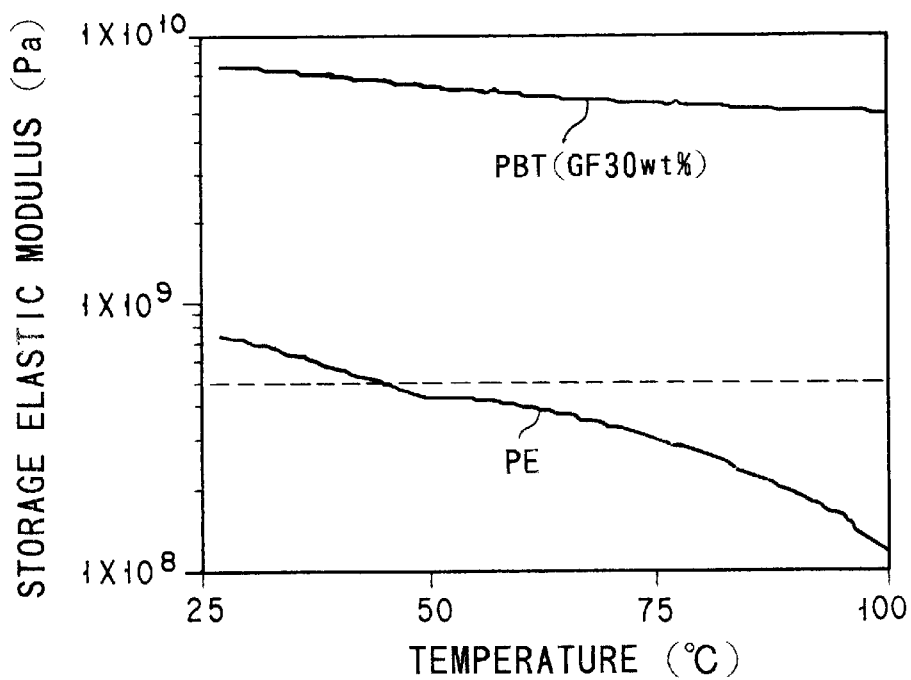
FIG. 3 is a graph showing changes in the storage elastic modulus of polyethylene and that of polybutylene terephthalate containing 30% by weight of glass fibers with temperature.
Figure 4:
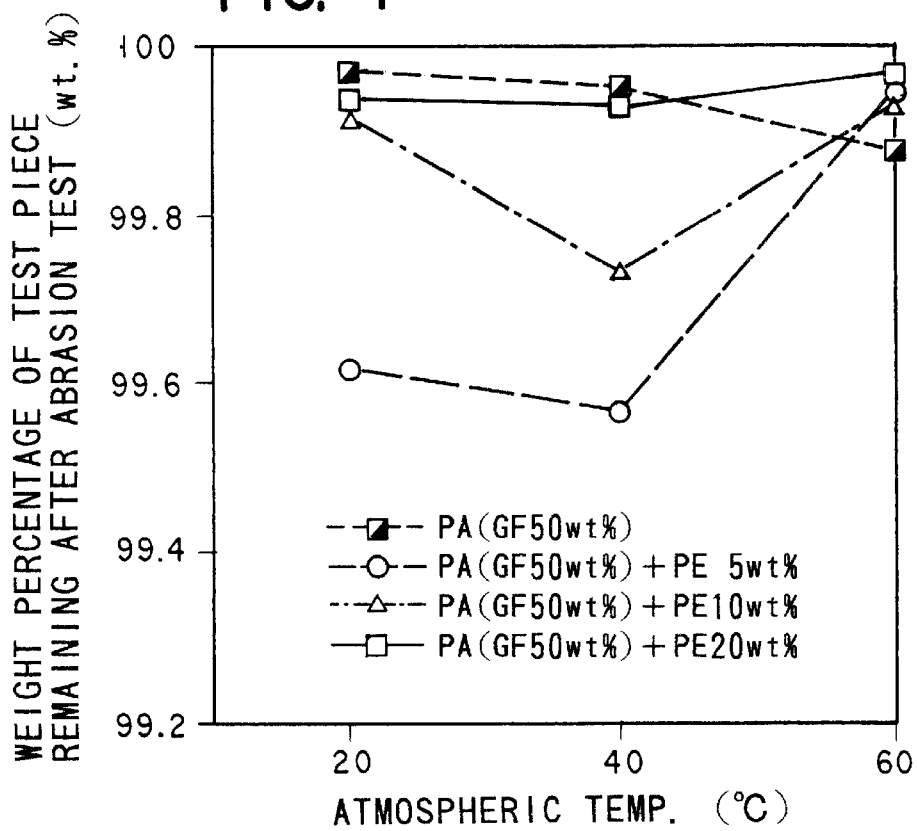
FIG. 4 is a graph showing changes in the amount of abrasion found in an abrasion resistance test performed on a polyamide-based resin containing 50% by weight of glass fibers and species of this fiber-reinforced resin just mentioned additionally incorporating therein 5% by weight, 10% by weight, and 20% by weight respectively of polyethylene.

To demonstrate this point more precisely, substances having various storage elastic moduli were selected as materials for incorporation as a sliding property-imparting agent and tested for abrasion resistance and measured for storage elastic modulus. To be specific, a test piece prepared from a fiber-reinforced resin combining a polyamide-based resin (made by Mitsubishi Engineering Plastics K. K. and sold under the trademark designation of "Reny 1022 HS") with 50% by weight of glass fibers (GF) and test pieces prepared from fiber-reinforced resins combining the fiber-reinforced resin mentioned above with 5% by weight, 10% by weight, and 20% by weight respectively of polyethylene (PE) possessing such a storage elastic modulus as shown in FIG. 3 and adopted as a sliding property-imparting agent were tested for abrasion resistance and the results of the test were compared. The results are shown in FIG. 4. It is clearly noted from FIG. 4 that the effect of the polyethylene as the sliding property-imparting agent manifested conspicuously in the neighborhood of 60° C.

In the diagram, the abscissa axis is the scale of the atmospheric temperature of the site of test and the ordinate axis the scale of the weight percentage of the amount of the test piece remaining after a prescribed period of the test, with the weight of the test piece prior to the test taken as 100%. The abrasion test was performed in the same manner as the abrasion test described above in connection with FIG. 1.

It deserves attention that the data of FIG. 4 also show a sign of improvement of the wear resistance in the neighborhood of 60° C. As shown in FIG. 3, the storage elastic modulus of the polyethylene (the sliding property-imparting agent) in the neighborhood of 60° C. was certainly not more than $5 \times 10^8$ Pa.

Figure 5:
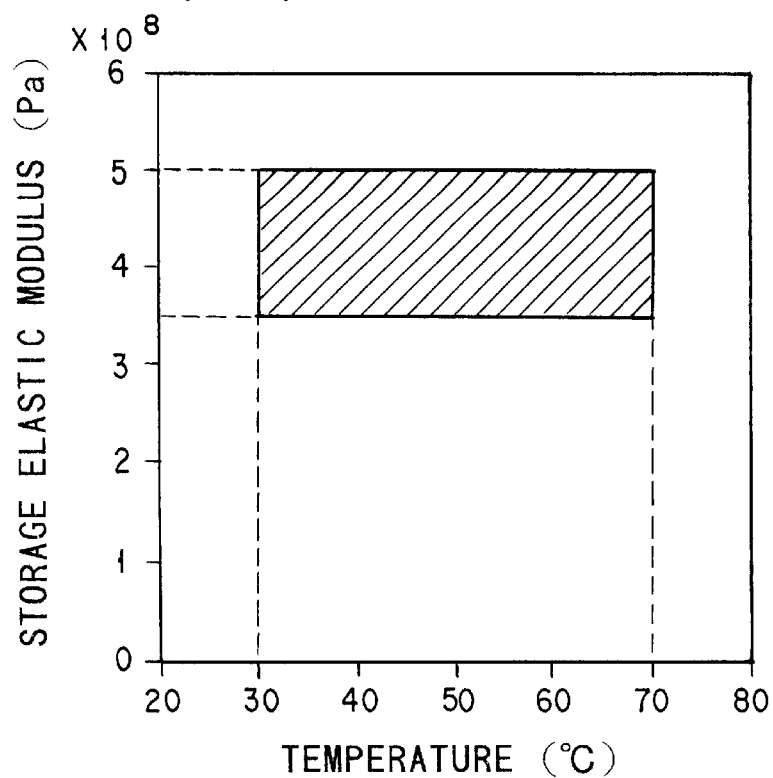
FIG. 5 is a graph showing the range of storage elastic modulus of a material usable as a sliding property-imparting agent in the present invention.

The materials which are usable as the sliding property-imparting agent in the present invention have storage elastic moduli which fall in the range illustrated in FIG. 5.

As shown in FIG. 5, in order for the material used as the sliding property-imparting agent in the formed article of the fiber-reinforced thermoplastic resin to manifest the effect thereof properly, it is an important requirement that the storage elastic modulus of the material is not more than $5 \times 10^8$ Pa in a temperature range of 30° C. to 70° C. So long as the storage elastic modulus of the material as the sliding property-imparting agent is not less than $3.5 \times 10^8$ Pa, this material does no harm to the high strength aimed primarily at by the fiber-reinforced thermoplastic fiber and is thought to be practically useful.

The temperature range up to 70° C. is thought to constitute itself a practical range in view of the environment of the use to be found for the sliding member, a possibly specific outlet for the product such as, for example, the slider for the slide fastener.

The major point of the present invention, as described above, resides in incorporating in the thermoplastic resin reinforced with fibers a material possessing a storage elastic modulus in the range of $3.5 \times 10^8$ Pa to $5.0 \times 10^8$ Pa in a temperature range of 30° C. to 70° C. as a sliding property-imparting agent.

As shown in FIG. 2, polytetrafluoroethylene perfectly meets the condition of the storage elastic modulus imposed on the material which is usable as the sliding property-imparting agent in the present invention. The use of this polytetrafluoroethylene or an analogous compound thereof as the sliding property-imparting agent, therefore, is advantageous, with the chemical stability thereof as a contributory factor.

Further, with a view to making the wear resistance manifest to better advantage, the proper amount of incorporation of the sliding property-imparting agent (polyethylene) into the fiber-reinforced thermoplastic resin [the polyamide-based resin (Reny 1022 HS)+50% by weight of glass fibers] was investigated. The results are shown in FIG. 6.

Figure 6:
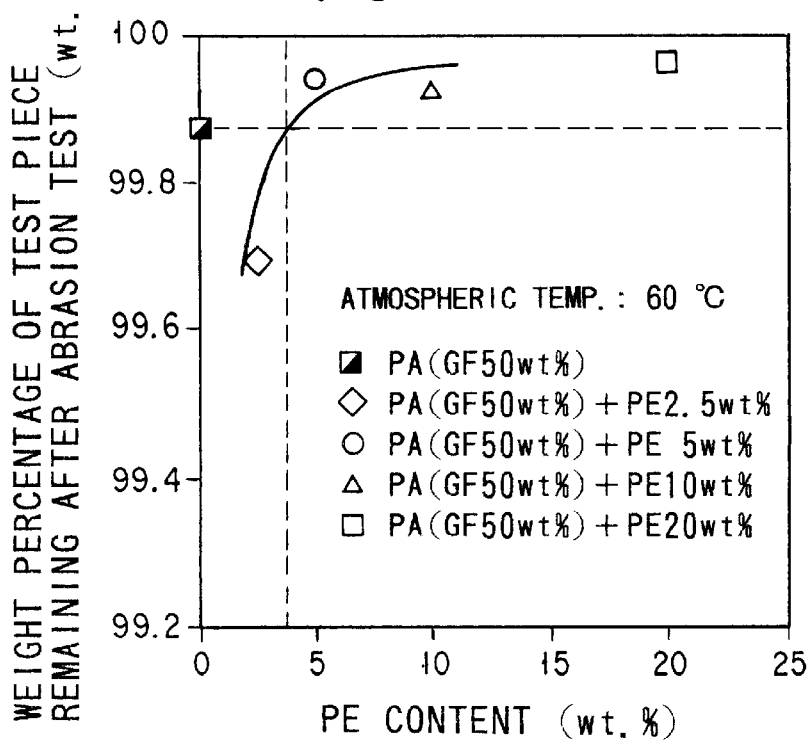
FIG. 6 is a graph showing the results of an abrasion resistance test performed on test pieces prepared from a polyamide-based resin containing 50% by weight of glass fibers and species of this fiber-reinforced resin just mentioned additionally incorporating herein 2.5% by weight, 5% by weight, 10% by weight, and 20% by eight respectively of polyethylene.

In FIG. 6, the abscissa axis is the scale of the polyethylene content and the ordinate axis the scale of the weight percentage of the residual amount of the test piece after the abrasion test (the original amount prior to the test taken as 100%). The abrasion test herein was performed in the same manner as the abrasion test explained above regarding FIG. 1.

It is clearly noted from FIG. 6 that the sliding property-imparting agent incorporated in the fiber-reinforced thermoplastic resin manifests the effect thereof when the amount of the incorporation is not less than 4% by weight based on the weight of the fiber-reinforced thermoplastic resin. If the amount of the incorporation of the sliding property-imparting agent is less than 4% by weight, no sign of improvement will be seen in the wear resistance. Conversely, if the amount of the incorporation is unduly large, this excess, though serving to improve the wear resistance, will notably impair the strength which forms the primary object of the use of the formed article of the fiber-reinforced thermoplastic resin. Further, the use of such an expensive material as polytetrafluoroethylene in the unduly large amount mentioned above deprives the present invention significantly of the practicality thereof because it results directly in boosting the cost of production. It is, therefore, proper to set the upper limit of the amount of incorporation of the sliding property-imparting agent at 10% by weight in the case of the polyamide-based resin or at 20% by weight in the case of other thermoplastic resin, respectively as the matrix resin, based on the weight of the fiber-reinforced thermoplastic resin.

The thermoplastic resin to be used in the present invention is fundamentally required to be a resin possessed of high rigidity. As concrete examples of the resin fulfilling this requirement, polybutylene terephthalate, polyethylene terephthalate, polycarbonate, and polyamide may be cited. The thermoplastic resin is further prefer-red to be possessed of a higher glass transition point, Tg, than the Tg of the sliding property-imparting agent. The reason for the requirement mentioned above is that the merit of utilizing the soft material as the sliding property-imparting agent is not obtained unless a difference of certain degree exists in rigidity, or storage elastic modulus, between the thermoplastic resin and the sliding property-imparting agent. From this point of view, polybutylene terephthalate or a polyamide-based resin is used particularly advantageously.

The reinforcing fibers to be used in the present invention are incorporated in the thermoplastic resin for the purpose of increasing the strength of this resin. As previously pointed out, however, the reinforcing fibers induce the thermoplastic resin incorporating them therein to suffer notable degradation of the wear resistance as compared with the same resin incorporating no reinforcing fiber at all therein. The best measure to improve the wear resistance, therefore, would consist in either totally omitting or decreasing to the fullest possible extent the use of the reinforcing fibers, which are the cause for the degradation of wear resistance. The sliding member made of resin, however, requires to aim simultaneously at improving wear resistance and acquiring high strength. In the case of adopting a thermoplastic resin for use in the sliding member, the use of such reinforcing fibers ought to prove indispensable when the behavior of these fibers is relied on to attain the improvement of the strength. As the point in balancing the factor of this strength against that of the wear resistance, therefore, it is essential that the amount of incorporation of the reinforcing fibers be retained within the range of 20 to 60% by weight, based on the weight of the thermoplastic resin. As the reinforcing fibers, glass fibers, carbon fibers, and metal fibers which are invariably light of weight and inexpensive can be used. These species of reinforcing fibers may be used either singly or in the form of a mixture of two or more members.

In the present invention, the thermoplastic resin, reinforcing fibers, and sliding property-imparting agent which have been manufactured respectively by well-known methods are effectively used without any particular restriction. Further, as to polytetrafluoroethylene, polybutylene terephthalate, polyamide, glass fibers, carbon fibers, and metal fibers, those manufactured respectively by well-known methods are effectively used without any particular restriction.

The method for producing the formed article contemplated by the present invention is not particularly discriminated. The most typical of various methods available for the production comprises the steps of preparatorily mixing polybutylene terephthalate by means of a kneading machine with a prescribed amount of glass fibers having compatibility imparted thereto by a surface treatment, adding a prescribed amount of polytetrafluoroethylene to the glass fiber-containing polybutylene terephthalate, further kneading them, and molding the resultant resin by means of an injection molding machine. This method allows the formed article of thermoplastic resin excelling in wear resistance and enjoying high strength to be produced easily with fine reproducibility.

The kneading temperature imposes no restriction particularly but requires only to exceed the temperature at which the thermoplastic resin to be used is melted. The kneading method to be used may be a method having no use for a kneading device, i.e. a method called dry blending. The sequence in which the components are mixed imposes no restriction particularly. The components may be mixed in an arbitrary sequence or they may be mixed altogether at once.

The formed article of thermoplastic resin according to the present invention which excels in wear resistance brings a prominent effect when it is used in a slider member for a slide fastener. The slider for a slide fastener which is manufactured, for example, by using polybutylene terephthalate as a thermoplastic resin, glass fibers as reinforcing fibers, and polytetrafluoroethylene as a sliding property-imparting agent, mixing them, and molding the resultant mixture in a relevant shape, when tested for wear resistance as rated in terms of the number of open-close reciprocations tolerated by the slide fastener in accordance with Japanese Industrial Standard (JIS) S 3015, is found to withstand about 4,000 open-close reciprocations. In contrast, the slider which is prepared by following the procedure mentioned above while omitting the addition of the sliding property-imparting agent tolerates only about 60 open-close reciprocations.

The formed articles of thermoplastic resin according to the present invention can be utilized as slider members in slide fasteners which are made of varying kinds of synthetic resins. Several embodiments are illustrated in FIG. 7 through FIG. 10.

Figure 7:
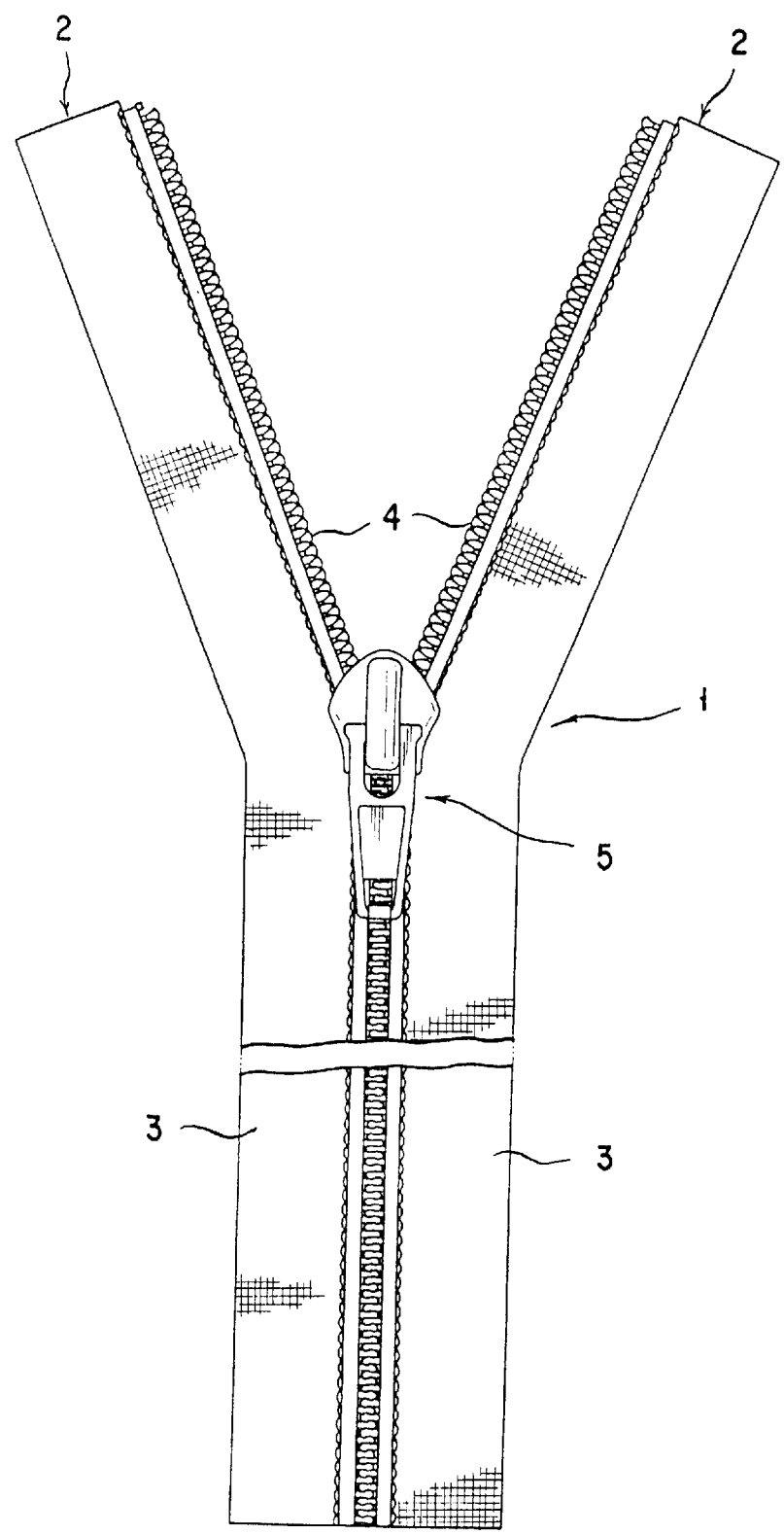
FIG. 7 is a plan view illustrating one embodiment of a slide fastener made of a synthetic resin.

FIG. 7 illustrates a slide fastener 1 which is used for opening and closing the opening in a garment or a bag and depicts the form of a product having the upper and lower ends of laterally paired fastener stringers 2 cut off. The fastener stringers 2 are composed of fastener tapes 3 made of synthetic resin and a row of coupling elements (coiled coupling elements) 4 made of synthetic resin attached fast to each of the opposed longitudinal edges of the fastener tapes 3. The fastener tapes 3 are formed by weaving and/or knitting synthetic resin fibers, manufactured from a non-woven fabric, or made of a sheet of synthetic resin. The coupling elements 4 are known in various forms such as, for example, those of the type obtained by injection molding the individual coupling elements and simultaneously attaching them fast to the edges of the fastener tapes, the continuous coupling elements such as the coiled coupling elements obtained by winding a monofilament of synthetic resin in the shape of a coil and the so-called zigzag coupling elements obtained by alternately connecting vertically in a zigzagging pattern in the longitudinal direction the portions bent in the shape of a letter U in the lateral direction in a plane, and the extrusion molded coupling elements obtained by attaching the opposite end portions of the individual coupling elements by means of extrusion molding to the two separate connecting cords (core cords) laid parallel to each other in the longitudinal direction thereby forming a composite resembling a ladder and bending the composite in the shape of a letter U around the longitudinal center line thereof. The reference numeral 5 denotes a slider which is slidable along the opposed rows of coupling elements for making and breaking engagement of the coupling elements. The slider 5 is formed of the fiber-reinforced thermoplastic resin of the present invention incorporating the sliding property-imparting agent therein.

Figure 8:
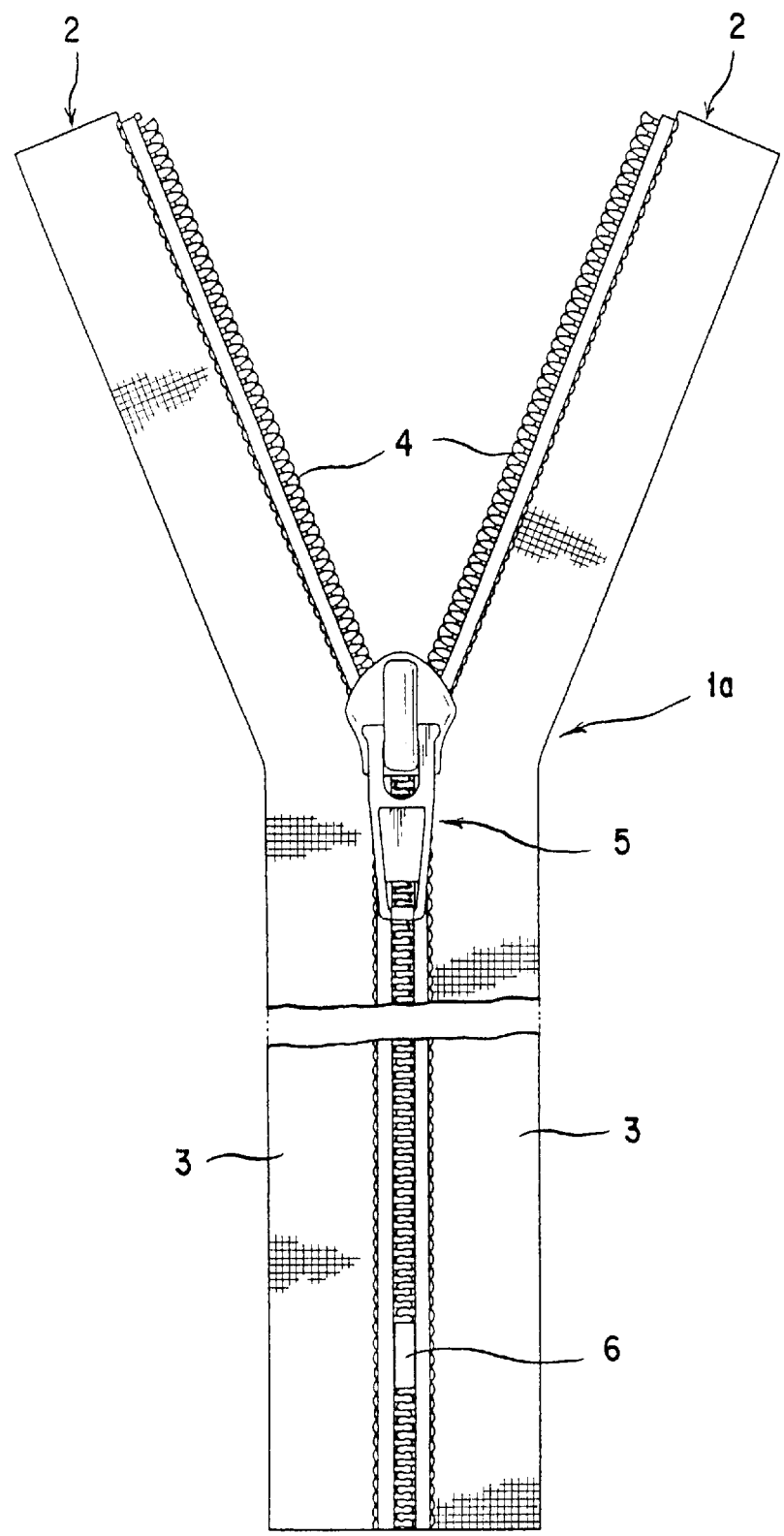
FIG. 8 is a plan view illustrating another embodiment of a slide fastener made of a synthetic resin.

A slide fastener 1a illustrated in FIG. 8 is in a form having the upper ends of the two fastener stringers 2 cut off. It is different from the slide fastener illustrated in FIG. 7 in respect that a lower stopping part 6 is formed by fusing the prescribed lower portions of the engaged rows of coupling elements 4.

Figure 9:
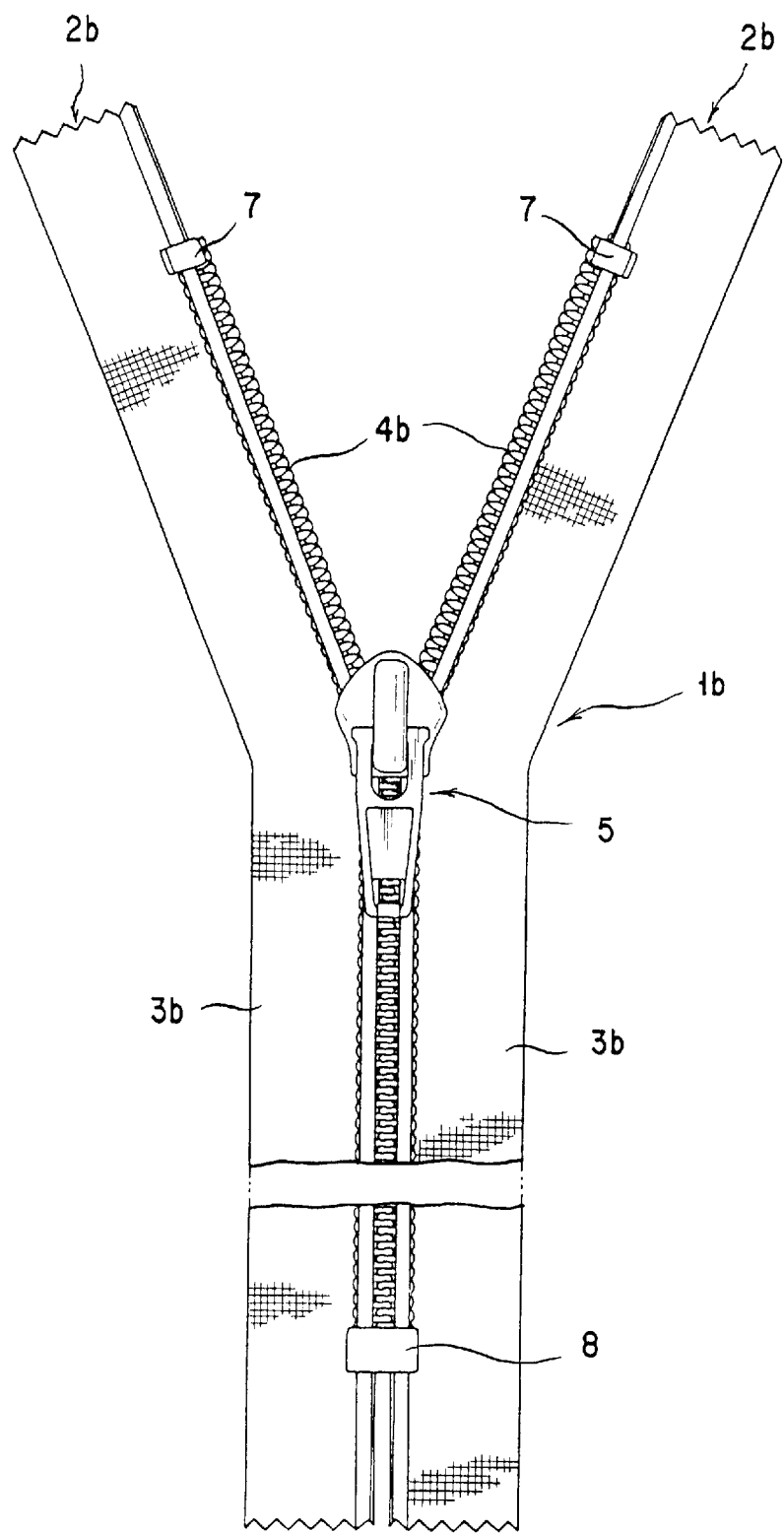
FIG. 9 is a plan view illustrating still another embodiment of a slide fastener made of a synthetic resin.

A slide fastener 1b illustrated in FIG. 9 is different from the slide fastener illustrated in FIG. 7 in respect that upper stop members 7 are attached respectively to the upper ends of the rows of coupling elements 4b attached fast to fastener tapes 3b of fastener stringers 2b and a lower stop member 8 is attached to the lower ends thereof.

Figure 10:
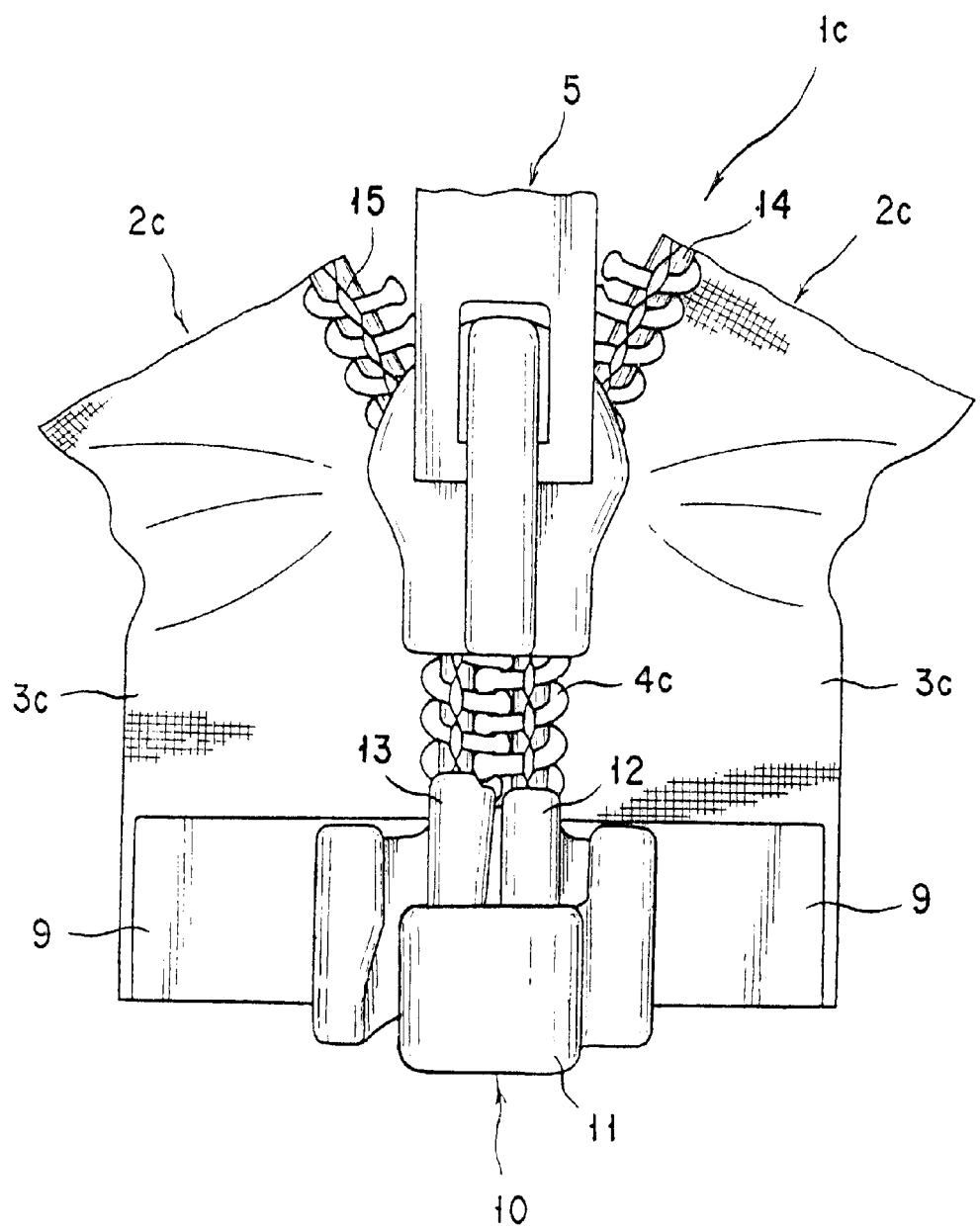
FIG. 10 is a partially cutaway plan view illustrating another embodiment of a slide fastener made of a synthetic resin.

FIG. 10 illustrates an open-link type slide fastener 1c. To the lower end portions of fastener tapes 3c of fastener stringers 2c, reinforcing sheet-like members (taffeta) 9 are welded through the medium of an adhesive layer (not shown). A box member 11 of a pin-and-box separator 10 is attached to the inner edge of one of the opposed reinforcing sheet-like members 9 and a butterfly rod or pin 13 is attached to the inner edge of the other reinforcing sheet-like member 9. The box member 11 is formed integrally with a box rod 12. The reference numeral 14 denotes a core cord which is inserted in the longitudinal direction through the empty space inside the spiral of the coiled coupling element 4c and the reference numeral 15 denotes a sewing thread sewing the core cord 14 and the coiled coupling element 4c along the longitudinal edge of the fastener tape 3c.

When the sliders for varying kinds of slide fasteners as mentioned above are formed of the fiber-reinforced thermoplastic resin of the present invention incorporating the sliding property-imparting agent therein, they exhibit extremely high durability to withstand open-close reciprocations. Heretofore, the difficulty which is encountered in the manufacture of a slider made of synthetic resin and endowed with high strength and high wear resistance or durability has formed the cause for defying all attempts to form all the component parts of the slide fastener invariably with synthetic resin. Since the present invention permits manufacture of a slider made of synthetic resin and endowed with high strength and high wear resistance or durability, it has become possible to produce all the component parts of a slide fastener invariably with synthetic resin. When such products as clothes and bags to which such slide fasteners are attached are discarded after use, therefore, the slide fasteners may be recovered from the discarded products and put to reuse. This fact contributes toward lessening the occurrence of industrial waste and, at the same time, proves highly significant from the standpoint of recycling waste and protecting the earth's environment.

Now, the following examples will be cited for the purpose of aiding in more specific description of the present invention.

EXAMPLE 1

In this example, a glass fiber-containing polybutylene terephthalate (made by Mitsubishi Rayon Company Limited and sold under the trademark designation of "Toughpet PBT 1101 G30", glass fiber content: 30% by weight) was selected and used as a reinforcing fiber-containing thermoplastic resin (raw material 1-A). Further, polytetrafluoroethylene was selected as a sliding property-imparting agent exhibiting a storage elastic modulus in the range of $3.5 \times 10^8$ Pa to $5.0 \times 10^8$ Pa in a temperature range of 30° C. to 70° C. Pellets having this agent incorporated in the glass fiber-containing polybutylene terephthalate mentioned above at a ratio of 5% by weight (raw material 1-B) or 10% by weight (raw material 1-C) were prepared. First, these pellets were dried under a reduced pressure at 120° C. for four hours. The dried pellets were immediately subjected to molding with an injection molding machine to produce a slider for a slide fastener. Thus, the sliders of the raw materials 1-A, 1-B, and 1-C were obtained as formed articles.

The formed articles 1-A, 1-B, and 1-C were respectively tested for durability to withstand open-close reciprocations of slider in accordance with JIS S 3015. The reciprocating motion of the slider had a stroke of 3 inches (76.2 mm) and a speed of 30 reciprocations per minute. The results are shown in Table 1.

As shown in Table 1, in the test for durability to withstand open-close reciprocations of slider, the average of the numbers found in a total of five runs of test was 4,129 in the case of the formed article 1-B containing 5% by weight of polytetrafluoroethylene and 980 in the case of the formed article 1-C containing 10% by weight of polytetrafluoroethylene, whereas it was 66 in the case of the formed article 1-A containing no polytetrafluoroethylene. The comparison of these results clearly indicates that the averages found for the formed articles containing polytetrafluoroethylene were far larger than that found for the formed article containing no polytetrafluoroethylene. Thus, the fiber-reinforced thermoplastic resin is enabled by incorporating therein a material possessing a storage elastic modulus in a prescribed range as a sliding property-imparting agent in a prescribed amount to acquire notably exalted wear resistance. When the slider as a sliding member in a slide fastener is formed of the fiber-reinforced thermoplastic resin containing the sliding property-imparting agent, it exhibits notably enhanced durability to withstand the open-close reciprocations of slider.

TABLE 1

| Formed article | Material | Durability, number of reciprocations (MH grade) | | | Number of samples |
| --- | --- | --- | --- | --- | --- |
| | | Average | Maximum | Minimum | |
| 1-A | Polybutylene terephthalate containing 30% by weight of glass fibers | 66 | 80 | 57 | 5 |
| 1-B | Polybutylene terephthalate containing 30% by weight of glass fibers + 5% by weight of polytetrafluoroethylene | 4129 | 5000* | 2150 | 5 |
| 1-C | Polybutylene terephthalate containing 30% by weight of glass | 980 | 3091 | 55 | 5 |

TABLE 1-continued

| Formed article | Material | Durability, number of reciprocations (MH grade) | | | Number of samples |
|---|---|---|---|---|---|
| | | Average | Maximum | Minimum | |
| | fibers + 10% by weight of polytetrafluoroethylene | | | | |

Remark
*Two samples on which the test was discontinued after 5000 reciprocations.

EXAMPLE 2

In this example, a glass fiber-containing polyamide-based resin (made by Mitsubishi Engineering Plastics K. K. and sold under the trademark designation of "Reny 1022 HS", glass fiber content: 50% by weight) was selected and used as a reinforcing fiber-containing thermoplastic resin (raw material 2-A). Further, polytetrafluoro-ethylene was selected as a sliding property-imparting agent exhibiting a storage elastic modulus in the range of $3.5 \times 10^8$ Pa to $5.0 \times 10^8$ Pa in a temperature range of 30° C. to 70° C. Pellets having this agent incorporated in the glass fiber-containing polyamide-based resin mentioned above at a ratio of 5% by weight (raw material 2-B) or 7% by weight (raw material 2-C) were prepared. Further, pellets having 10% by weight of polytetrafluoroethylene incorporated in a glass fiber-containing polyamide-based resin (made by Mitsubishi Engineering Plastics K. K. and sold under the trademark designation of "Reny 1022 HS", glass fiber content: 45% by weight) (raw material 2-D) were prepared. These pellets were dried under a reduced pressure at 120° C. for four hours. The dried pellets were immediately subjected to molding with an injection molding machine to produce a slider for a slide fastener. Thus, the sliders of the raw materials 2-A, 2-B, 2 C, and 2-D were obtained as formed articles.

The formed articles 2-A, 2-B, 2-C, and 2-D were respectively tested for durability to withstand open-close reciprocations of slider in accordance with JIS S 3015 in the same manner as in Example 1. The results are shown in Table 2.

As shown in Table 2, in the test for durability to withstand open-close reciprocations of slider, the average of the numbers found in a total of five runs of test was 1,151 in the case of the formed article 2-B containing 5% by weight of polytetrafluoroethylene, 2,204 in the case of the formed article 2-C containing 7% by weight of polytetrafluoroethylene, and 4,681 in the case of the formed article 2-D containing 10% by weight of polytetrafluoroethylene, whereas it was 353 in the case of the formed article 2-A containing no polytetrafluoroethylene. The comparison of these results clearly indicates that the averages found for the formed articles containing polytetrafluoroethylene were far larger than that found for the formed article containing no polytetrafluoroethylene. Thus, the fiber-reinforced thermoplastic resin is enabled by incorporating therein a material possessing a storage elastic modulus in a prescribed range as a sliding property-imparting agent in a prescribed amount to acquire notably exalted wear resistance. When the slider as a sliding member in a slide fastener is formed of the fiber-reinforced thermoplastic resin containing the sliding property-imparting agent, it exhibits notably enhanced durability to withstand the open-close reciprocations of slider.

TABLE 2

| Formed article | Material | Durability, number of reciprocations (MH grade) | | | Number of samples |
|---|---|---|---|---|---|
| | | Average | Maximum | Minimum | |
| 2-A | Polyamide-based resin containing 50% by weight of glass fibers | 353 | 408 | 244 | 5 |
| 2-B | Polyamide-based resin containing 50% by weight of glass fibers + 5% by weight of polytetrafluoroethylene | 1151 | 1845 | 845 | 5 |
| 2-C | Polyamide-based resin containing 50% by weight of glass fibers + 7% by weight of polytetrafluoroethylene | 2204 | 2480 | 2050 | 5 |
| 2-D | Polyamide-based resin containing 45% by weight of glass fibers + 10% by weight of polytetrafluoroethylene | 4681 | 4838 | 4551 | 5 |

Since the formed article of thermoplastic resin according to the present invention, as described above, is formed of what has been obtained by adding a proper amount of a material exhibiting storage elastic modulus in the range of $3.5 \times 10^8$ Pa to $5.0 \times 10^8$ Pa in a service temperature range of 30° C. to 70° C. to a thermoplastic resin reinforced with fibers, it retains the high strength imparted by the addition of the reinforcing fibers and, at the same time, enjoys notable improvement in wear resistance, and manifests the wear resistance conspicuously particularly in the service temperature range in which the temperature is elevated owing to the frictional heat caused by the sliding motion of a sliding member.

The formed article of thermoplastic resin according to the present invention, therefore, can be advantageously used as sliding parts of varying sorts. It exhibits extremely high durability to withstand open-close reciprocations when it is used as a slider in a slide fastener.

While certain specific embodiments and working examples have been disclosed herein, the invention may be embodied in other specific forms without departing from the spirit or essential characteristics thereof. The described embodiments and examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A slide fastener, said slide fastener having a slider, said slider comprising a fiber-reinforced resin material of polyamide containing reinforcing fibers and incorporating therein additionally as a sliding property-imparting agent a material having a storage elastic modulus in the range of $3.5 \times 10^8$ Pa to $5.0 \times 10^8$ Pa in a service temperature range of 30° C. to 70° C. at a ratio of at least 4% by weight and less than 10% by weight, based on the total weight of said polyamide and said reinforcing fibers.

2. The slide fastener according to claim 1, wherein said sliding property-imparting agent is selected from the group consisting of fluoropolymers and polyethylene.

3. The slide fastener according to claim 1, wherein said sliding property-imparting agent is polytetrafluoroethylene.

4. The slide fastener according to claim 1, wherein said reinforcing fiber is present in an amount of 20 to 60% by weight, based on the weight of said polyamide.

5. The slide fastener according to claim 1, wherein said reinforcing fiber is at least one member selected from the group consisting of glass fibers, carbon fibers, and metal fibers.

6. The slide fastener according to claim 1, wherein said fiber-reinforced resin material contains said sliding property-imparting agent in an amount of 4 to 7% by weight, based on the total weight of said polyamide and said reinforcing fibers.

7. The slide fastener according to claim 1, wherein said sliding property-imparting agent is polyethylene.

* * * * *